Feb. 21, 1928.

R. BLUMBERG 1,660,114

EMERGENCY APPARATUS FOR DAMAGED SHIPS

Filed Aug. 23, 1923 11 Sheets-Sheet 1

Inventor
RALPH BLUMBERG,
By Prentiss, Stone & Boyden, Attorneys.

Feb. 21, 1928.

R. BLUMBERG 1,660,114

EMERGENCY APPARATUS FOR DAMAGED SHIPS

Filed Aug. 23, 1923     11 Sheets-Sheet 2

Inventor
RALPH BLUMBERG,
By Prentiss, Stone & Boyden,
Attorneys

Feb. 21, 1928.

R. BLUMBERG

1,660,114

EMERGENCY APPARATUS FOR DAMAGED SHIPS

Filed Aug. 23, 1923     11 Sheets-Sheet 4

Feb. 21, 1928. 1,660,114
R. BLUMBERG
EMERGENCY APPARATUS FOR DAMAGED SHIPS
Filed Aug. 23, 1923 11 Sheets-Sheet 8

Feb. 21, 1928.

R. BLUMBERG

EMERGENCY APPARATUS FOR DAMAGED SHIPS

Filed Aug. 23, 1923  11 Sheets-Sheet 11

Patented Feb. 21, 1928.

1,660,114

UNITED STATES PATENT OFFICE.

RALPH BLUMBERG, OF BALTIMORE, MARYLAND.

EMERGENCY APPARATUS FOR DAMAGED SHIPS.

Application filed August 23, 1923. Serial No. 658,965.

This invention relates to emergency safety apparatus for temporarily stopping a rent in the hull of a ship caused by torpedo, collision, or other accident. More specifically the present invention is in the nature of a further development of and improvement upon the apparatus shown in my three prior co-pending applications, Serial No. 224,827, filed March 26, 1918, Serial No. 358,480½, filed Feb. 13, 1920, and Serial No. 451,178, filed March 10, 1921.

Among the objects of the invention are to provide improved means for supporting a mattress and for lowering the same into position; to devise improvements in the structure of the mattress itself and in the method of securing the same over the rent; to provide re-enforcing means to enable the mattress to better withstand the pressure, after the water has been pumped out of the hull; and to devise improved means whereby two or more mattresses may be quickly and successively positioned over the rent in superposed relation.

In order that my invention may be readily understood, reference is had to the accompanying drawings forming a part of this specification and in which:—

Referring to the drawings, I will first describe that embodiment of the invention shown in Figs. 1 to 5 thereof, supplemented by the detailed views of Figs. 21 to 27 and 30 to 32.

Figures 3, 21, 22, 23, 24:
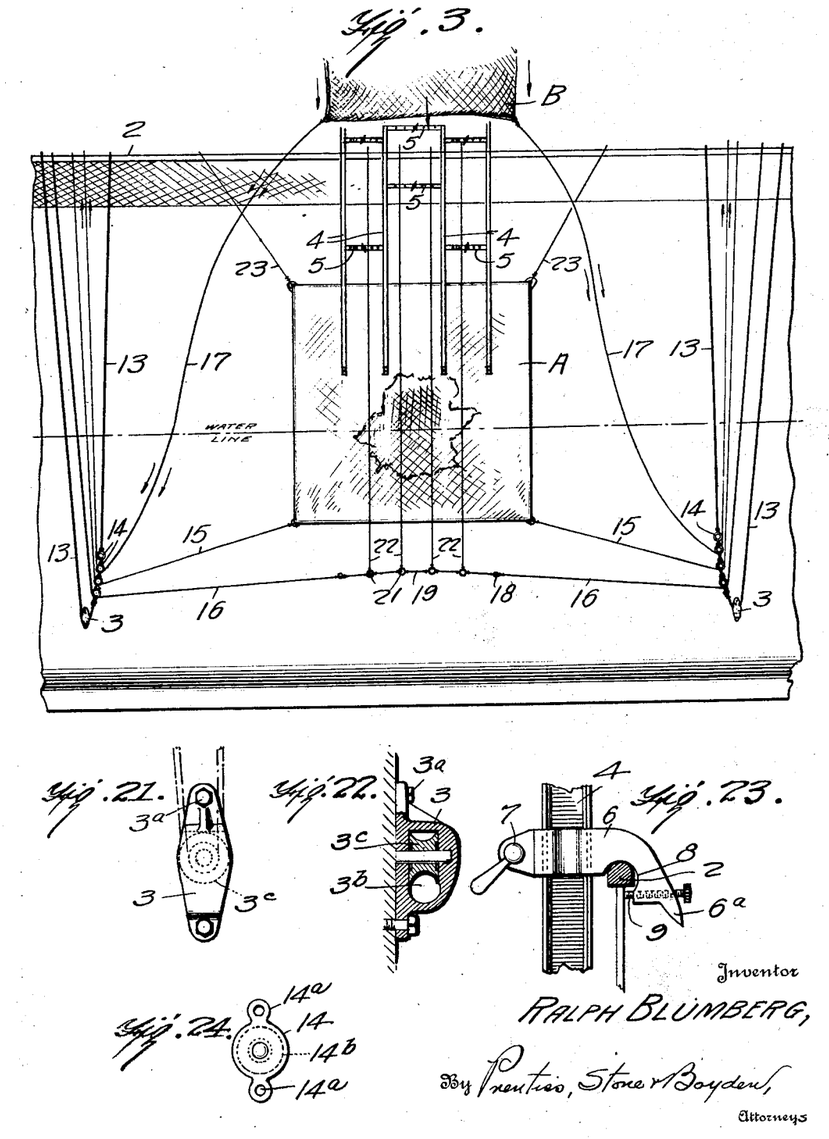
Fig. 21 is an elevation of the cable guiding means which I prefer to employ.
Fig. 22 is a vertical section therethrough.
Fig. 23 is a fragmentary side elevation of one of my improved positioning bars employed to aid in the manipulation of the mattress, and also showing the rail of the ship in section.
Fig. 24 is an elevation on an enlarged scale of one of the pulleys which I prefer to use in connection with my various improved cable systems.

The reference numeral 1 designates the hull of a ship and 2 the usual rail which runs around the deck. 3 designates cable guiding means, which may consist of a mere staple, eye or ring, but preferably comprises the construction shown in Figs. 21 and 22. Referring to these figures, it will be seen that 3 designates a block adapted to be secured to the side of the hull by means of bolts or screws $3^a$ and having an opening $3^b$ therein, through which the cable passes, a pulley $3^c$ being journaled within this opening. These pulley blocks or guiding means are secured to the hull at relatively great distances apart, such as two hundred or more feet, at a point well below the water line, and preferably near the keel or center board. It will be seen, therefore, that but very few of these guiding means will be required on each side of the hull, even on the largest ships, and this constitutes one of the most important features of the present invention.

Figures 25, 26, 27, 28, 29, 30, 31, 32:
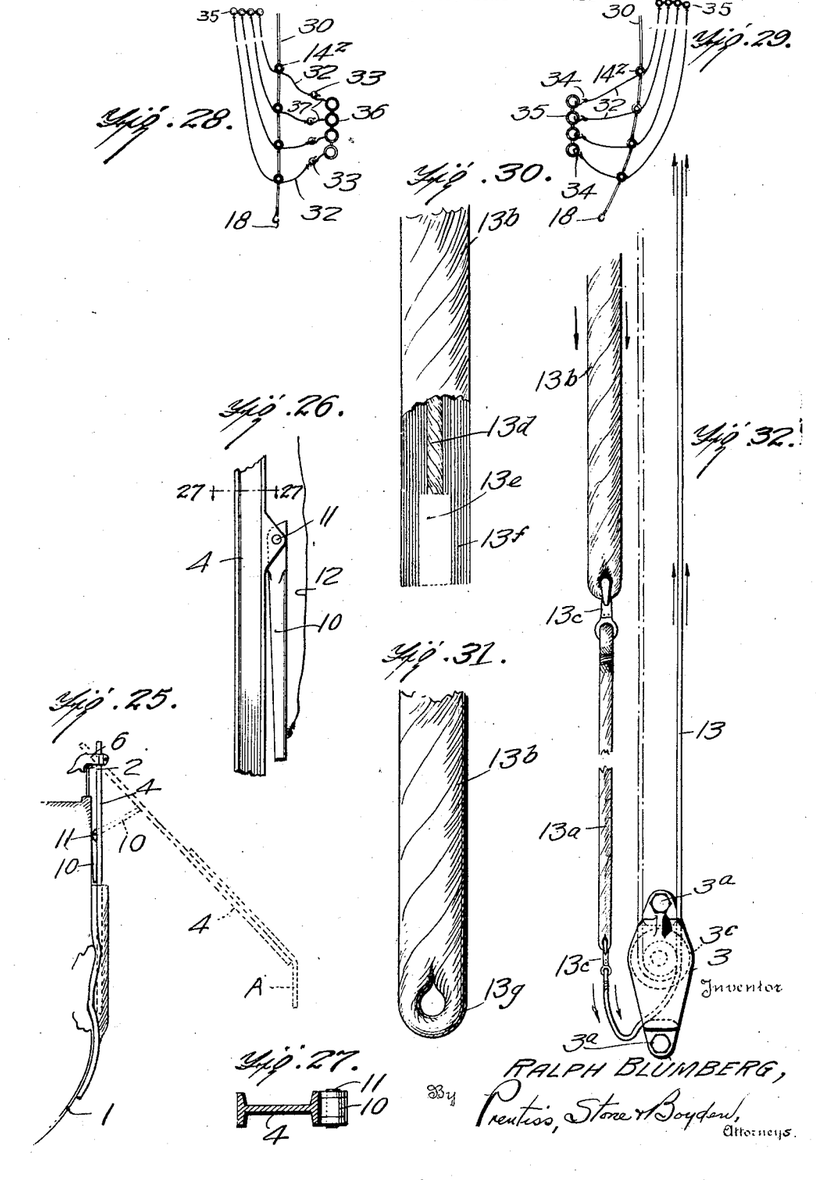
Fig. 25 is a sectional elevation illustrating the method of using my improved positioning bars such as shown in Fig. 23.
Fig. 26 is a fragmentary side elevation of one of such bars showing the pivoted brace which is attached thereto.
Fig. 27 is a transverse section substantially on the line 27—27 of Fig. 26, on a somewhat enlarged scale.
Figs. 28 and 29 are fragmentary details showing my preferred method of preventing my cable system from becoming tangled when not in use.
Fig. 30 is a side elevation on an enlarged scale, partly in section, showing a method of cutting the end of a cable in order to form a splice.
Fig. 31 is a side elevation of such cable after the splice has been made.
Fig. 32 is an enlarged detail showing the method of connecting the pilot line with the larger supporting cables which I preferably employ.

4 designates my improved positioning or launching bars, any suitable number of may be employed. As shown, two pairs of such bars are used, being connected by adjustable spacing rods 5. These bars are preferably in the nature of I-beams, as indicated in Figs. 23, 26 and 27, and are suspended from the rail 2 by means of special brackets 6. These are clamped around the bars 4 as by means of a clamping screw 7 and are formed with a notch or seat 8 adapted to engage over the rail 2, as clearly shown in Fig. 23. A set screw 9 may also be provided to engage under the rail and prevent accidental displacement of the device after it has been properly placed. In case a rail is not available, a beak or prong $6^a$ is provided which is adapted to engage the deck or other smooth wooden support. In any event, it will be noted that the method of mounting described permits the bars to swing as on a pivot, so that they may be swung outwardly from the side of the ship, as shown in dotted lines in Fig. 25.

The bars are provided with a brace or strut 10, pivoted thereto as at 11, as shown in Fig. 26, the free end of said strut being adapted to bear against the side of the hull so as to maintain the bars in the inclined position shown in dotted lines in Fig. 25. When it is desired to release the bars it is only necessary to swing them slightly upward. This will permit the braces 10 to fall away, and the bars 4 then swing back into contact with the side of the hull, as shown in full lines in Fig. 25. A line 12 is secured to the strut 10, by means of which it may be manipulated and brought into position.

When the bars are spaced from the side of the ship, as shown in dotted lines in Fig. 25, they constitute an inclined bridge or way down which the mattresses, as well as the cables hereinafter described, may slide, as indicated at A in Fig. 25. It will be understood, of course, that these bars are kept stored in some suitable place on shipboard, and are brought out and hung over the side only when an emergency arises.

Looped through each pulley block or guiding means 3 is a line or cable 13, the nature of which will now be explained, by reference to Figs. 30 to 32. In Fig. 32, I have designated by the numeral 13, a relatively light and thin pilot line. This line is looped through the pulley blocks 3, as described, and remains constantly in position, extending up along the side of the hull and being suitably secured at its upper ends. Being of very small diameter, the resistance which the presence of this line offers to the movement of the ship through the water is negligible.

This pilot line, however, is not strong enough to perform the service required in case of an emergency. I therefore connect it to a larger rope $13^a$, as shown in Fig. 32, the end of the rope $13^a$ being in turn connected to a still heavier cable $13^b$. The method of connecting these, and all other cables referred to in this specification, is preferably by means of snap hooks $13^c$.

The foregoing arrangement of light, intermediate and heavy cables is substantially the same as that described in my prior copending application, Serial No. 451,178, filed March 10, 1921, and is for the same purpose. In other words, the line 13 is preferably so light that it is not of sufficient strength to carry the heavy cable $13^b$ and for this reason the intermediate cable $13^a$ is employed. The cable $13^b$ is heavier, of the size required to be eventually used to support my mattress rigging, in case of emergency, so that when occasion arises, the line 13 and rope $13^a$ are pulled in the direction indicated by the arrows in Fig. 32, until the heavy cable $13^b$ is completely looped through the cable guide or pulley block 3, and is firmly secured on the deck or elsewhere.

In order to avoid the use of ungainly knots for securing these cable ends together, I preferably adopt the method of connection shown in Figs. 30 and 31. The cable $13^b$ preferably employed is made up of a core $13^d$ of suitable material, surrounded by strands $13^f$. I preferably cut away the end of the core $13^d$ and some of the inner strands, as indicated at $13^e$, and the remaining strands are then interwoven or spliced together, after the manner known to sea-faring men, so as to form a smooth eye, as shown at 13ᵍ in Fig. 31. In this way, a connection can be made which is of no greater diameter than that of the cable itself, and the connected cables can then pass freely through the pulley block 3. While, of course, the strength of the eye 13ᵍ is not as great as that of the cable 13ᵇ itself, it will be understood that no very great strength is required, because this eye is not called upon to carry any load or withstand any considerable tension. The only strain ever imposed upon the eye 13ᵍ is that due to the simple weight of the cable itself. In other words, the eye is employed only when threading the cable system through the guiding means. The main cable 13ᵇ is itself firmly anchored in position before any heavy strain or load is applied.

While, in the smaller scale views of the present drawings, I have, in every case, designated simply by the numeral 13 the line or cable which passes around the pulley blocks 3, it will be understood that I contemplate using, instead of a simple cable, the connected cable system shown in detail in Fig. 32.

Referring again to Fig. 1, the two cables 13 are shown as looped through the two pulley blocks 3, and the ends of these cables pass up to the deck or other convenient point.

One end of the cables 13 has connected thereto a series of rings or pulleys 14. While plan rings could doubtless in some cases be used, I prefer to employ pulley blocks of the form shown in Fig. 24, these blocks having eyes 14ᵃ at opposite sides thereof and having a pulley 14ᵇ mounted therein. Whenever, therefore, in these drawings the numeral 14 occurs, it will be understood that it represents a pulley block of the general nature shown in Fig. 24.

Figure 1:
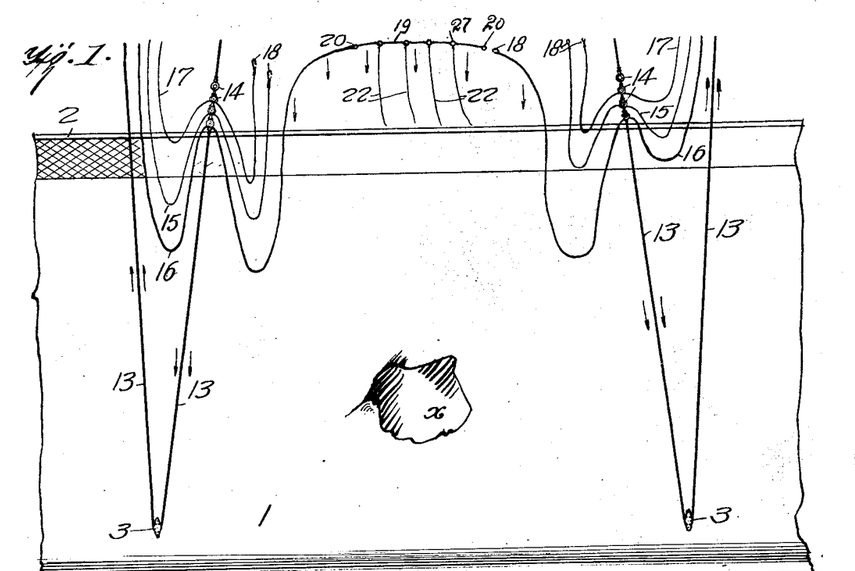
Figs. 1 to 4 are fragmentary side elevations of the hull of a ship, illustrating successive steps employed in positioning a pair of mattresses over a rent, in accordance with one form of my invention.
Figure 2:
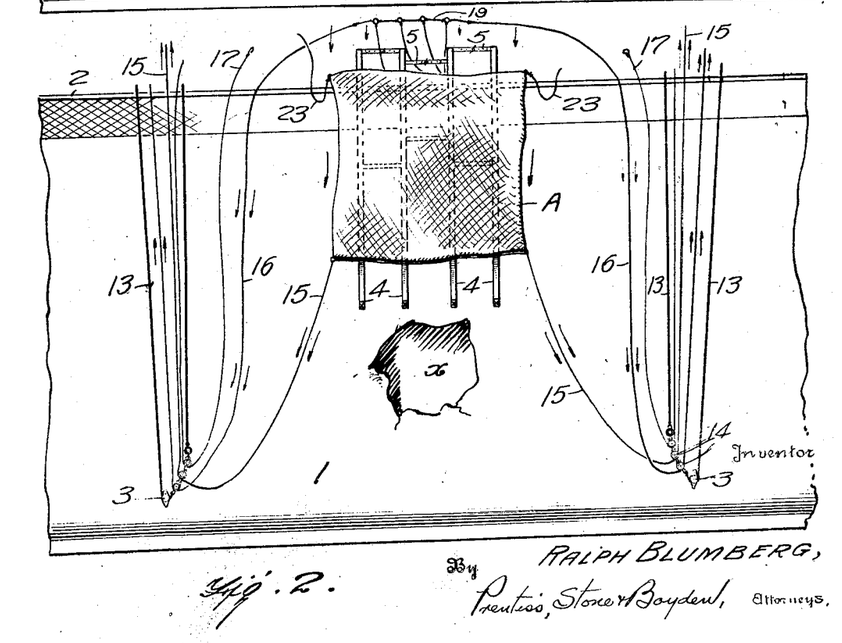

Looped through each set of pulleys 14 in Fig. 1, are three or more cables 15, 16 and 17. The cables 15 and 17 are each provided at one end with snap hooks 18, while one of the cables 16 is connected at its end with a cable 19 or the like, having therein a series of rings 21 to which are secured one end of a series of re-enforcing cables 22. The free end of the cable 19 has a ring 20 adapted to be engaged by the snap hook 18, carried by the other cable 16, so that when connected, the cables 16 and chain 19 constitute one continuous line, as shown in Fig. 2.

It will be understood, of course, that the rigging 15, 16, 17, 19, 22 etc. is suitably stored on the deck or elsewhere when not in use. When an emergency arises, this rigging is brought out and arranged as shown in Fig. 1, and the launching bars 4 are also produced and hung over the side, as shown in Fig. 25. The snap hooks 18 at the ends of the cables 15 are then engaged with the lower corners of a suitable mattress A, which mattress is placed upon the bars 4 and slid outwardly and downwardly along the same, the upper edge of the mattress being held and guided by means of cables 23 attached thereto.

By pulling on the lines 15, the mattress is caused to slip off of the end of the bars 4, and then by pulling up on the ropes 23, the mattress is elevated until it is properly positioned over the rent x, as shown in Fig. 3.

Next, the ends of the cables 16 are hauled in, with the result that the chain 19 is brought into the position shown in Fig. 3, thus bringing the lower ends of the re-enforcing cables 22 to a point immediately below the rent, so that these cables extend upwardly in a vertical direction and by tightening the upper ends thereof, they may be stretched across the rent as shown. In this connection, it should be noted that by manipulating the cables 16, the cable 19 may be shifted longitudinally of the ship, so as to bring the cables 22 into the proper position.

Figures 4, 5:
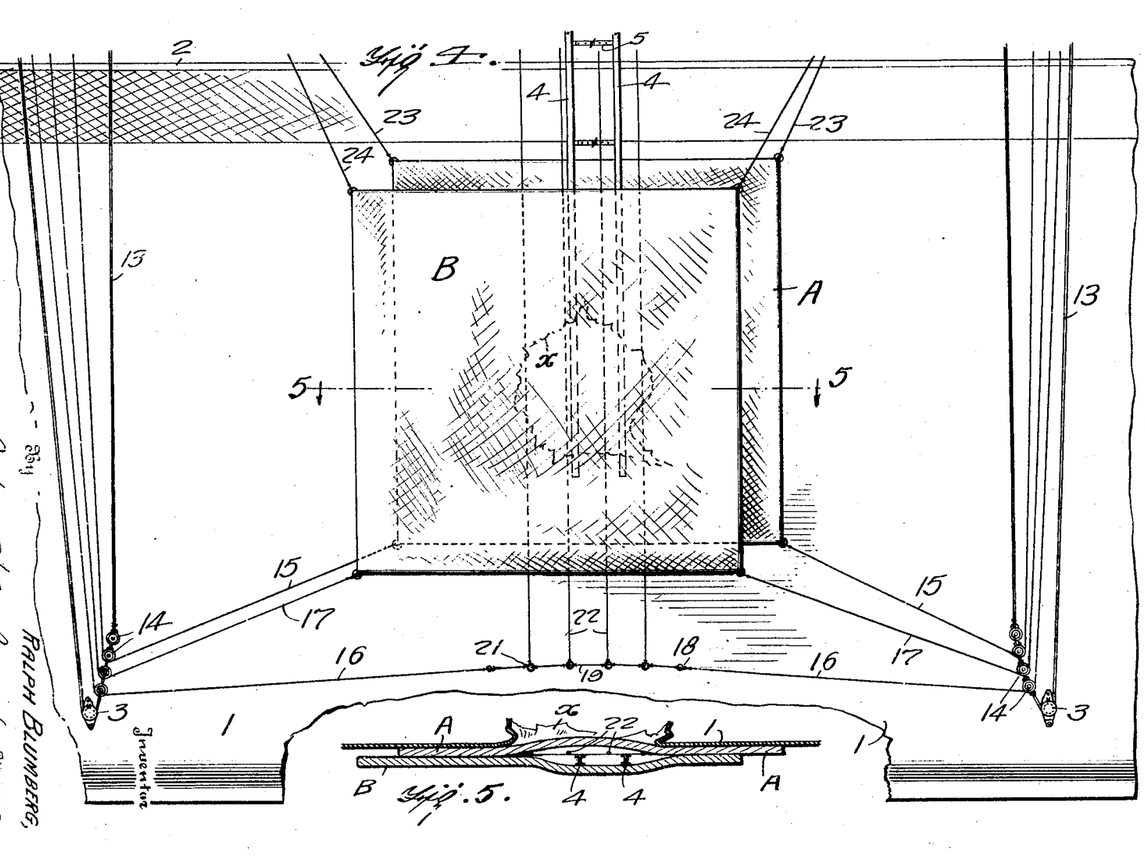
Fig. 5 is a horizontal section substantially on the line 5—5 of Fig. 4.
Figure 6:
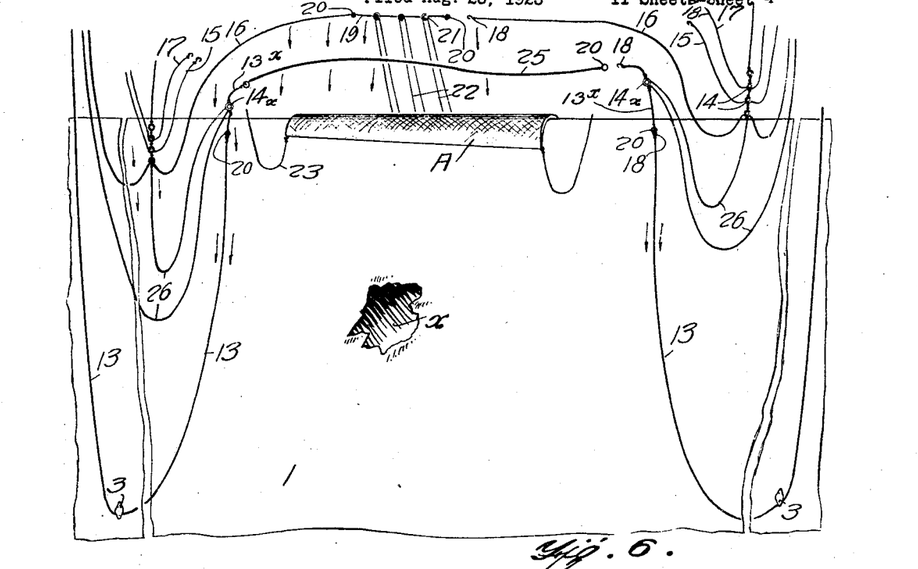
Figs. 6, 7, 8 and 9 are fragmentary side elevations showing the hull of a ship, and illustrating four successive steps of positioning two mattresses over a rent, in accordance with another form of my invention.
Figure 7:
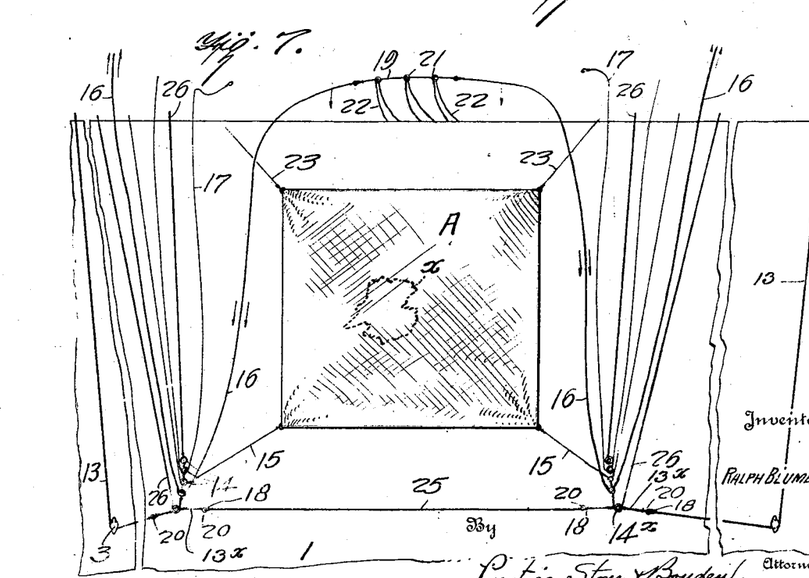
Figure 8:
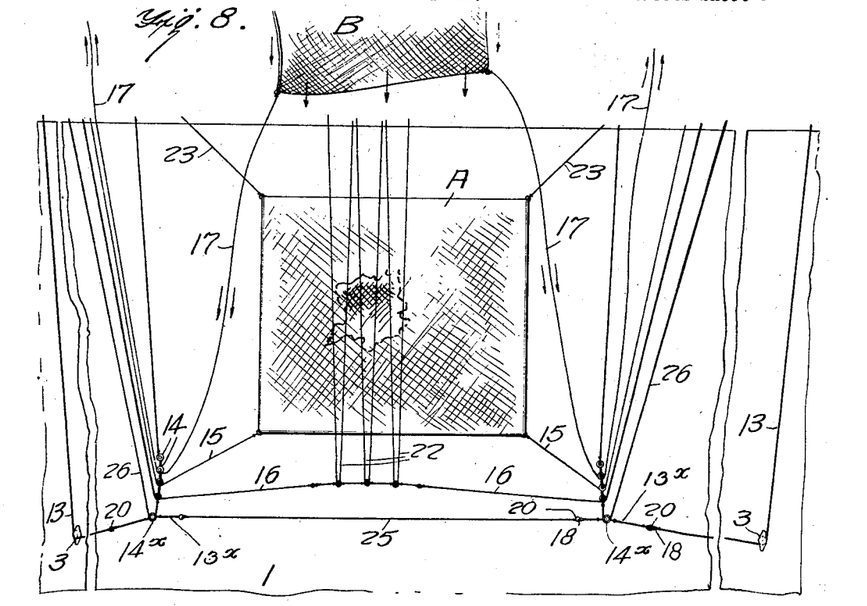
Figure 9:
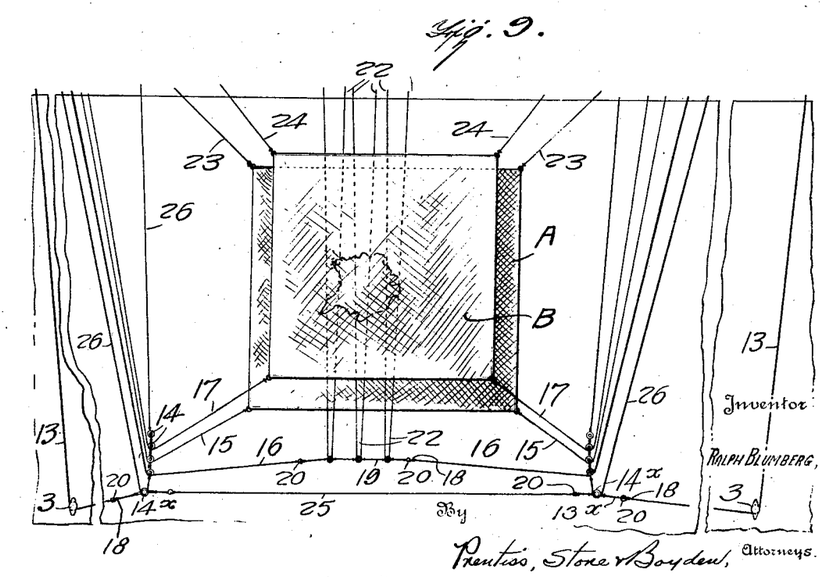

The props or braces 10 are next removed from under the bars 4 by tilting the bars backward, slightly, as described, and these bars fall against the side of the hull, or rather, swing inwardly until they rest against the outside of the mattress A. In case all four of such bars are not needed, two of them may be disconnected and removed, leaving only two such bars in position across the rent, as shown in Fig. 4. After the bars and reenforcing cables 22 are in the position shown, the ends of cables 17 are secured to a second mattress B, and by hauling on the free ends of these cables, this mattress is also pulled down over the side and superposed upon the mattress A, as shown in Fig. 4, the upper edge of the mattress B being held by means of suitable cables 24.

Thus, in the final position, the two mattresses A and B overlie the rent, with the cables 22 and bars 4 between them, such bars and cables constituting re-enforcing means to enable the mattress to withstand the pressure of the water against them. It will be understood that so long as the hull contains a large quantity of water, so that there is water on both the inside and outside of the rent, there is no great amount of pressure against the first mattress when the same is placed over the rent. Therefore, I propose to first place the mattress A as quickly as possible. This prevents further water from entering. I then proceed to stretch the re-enforcing cables and place the second mattress B over them. When the pumps are operated and the water removed from the inside of the hull, the pressure on the mattresses of course becomes enormous, and the purpose of the cables 22 is to enable the outer mattress B to withstand this great pressure.

While in the following figures I have not shown the use of the bars 4, it will be understood that such bars may of course be employed if desired, in addition to the other rigging hereinafter described.

Figs. 6, 7, 8 and 9 show a slightly different method of securing substantially the same results. In these figures, instead of inserting the series of pulleys 14 directly in the cable lines 13, I connect to each of these cables only a single pulley $14^x$. This pulley $14^x$ is carried by a short section of cable $13^x$, connected with the cable 13 by means of a hook and ring, 18, 20, as shown. The free ends of the short cable sections $13^x$ are then united by means of a special connecting cable 25 of definite length, the attachment being by means of hooks and rings, 18, 20, as before. Then, by pulling upon the cables 13, the connecting cable 25 is brought from the position shown in Fig. 6, to that illustrated in Fig. 7, thus forming a tightly stretched line extending the entire distance between the cable guides 3, and including the two pulley blocks $14^x$.

Around these pulley blocks are looped two cables 26, and these cables carry the sets of pulleys 14 such as shown in Fig. 4.

Associated with these pulleys 14 are the same pairs of cables 15, 16 and 17, as shown in the preceding figures, and they are operated in the same manner, the only difference being that the re-enforcing cables 22 are shown in Figures 6 to 9, as being looped through the rings 21, instead of secured at one end thereto.

A comparison of Figs. 1 to 4 with 6 to 9 shows that the arrangement and the successive steps in the method of manipulating the rigging is substantially the same, the only difference being that in the first group, the pulleys 14 and their associated cables are carried directly by the cables 13, while in the second group, these pulleys are carried only indirectly by the cables 13, being secured directly to cables 26, which are themselves carried by the cables 13.

As a result of the use of these extra cables 26, however, it will be observed that not only can the re-enforcing cables 22 be shifted longitudinally of the ship, but the pulleys 14 can themselves be thus shifted, whereby they may be so positioned as to manipulate and secure the mattresses to the best advantage.

It is of course desirable that pulleys $14^x$, carrying cables 26 and their associated apparatus, be located close to the rent. To this end I propose to equip each vessel with a series of cables 25 of assorted lengths, such, for example, as 50 feet, 75 feet, 100 feet, etc. The most suitable length will then be selected, when an emergency arises, the proper length in any given case being determined by such considerations as the size of the rent, and the degree of certainty with which its exact location is known. If the rent is a small one, and its position definitely known, obviously a short cable can be used, and is preferable. Otherwise a longer cable will have to be employed.

In Figs. 10 to 16, inclusive, I have shown a series of views illustrating the successive steps of manipulating a still further modified rigging, such rigging including means for supporting and positioning horizontally extending as well as vertically extending re-enforcing cables.

Similar reference numerals, of course, designate similar parts, as in the preceding views, and as to these parts, no detailed description seems necessary. While in Figs. 8 and 9, the cables 26 carry pulleys 14 through which only simple cables are looped, in Figs. 10 to 16, there is looped around one of the pulleys 14 a cable system 28, itself carrying a pair of pulleys $14^y$, and a second set of four pulleys $14^z$. Around each of these pulleys, a cable is looped.

Figure 10:
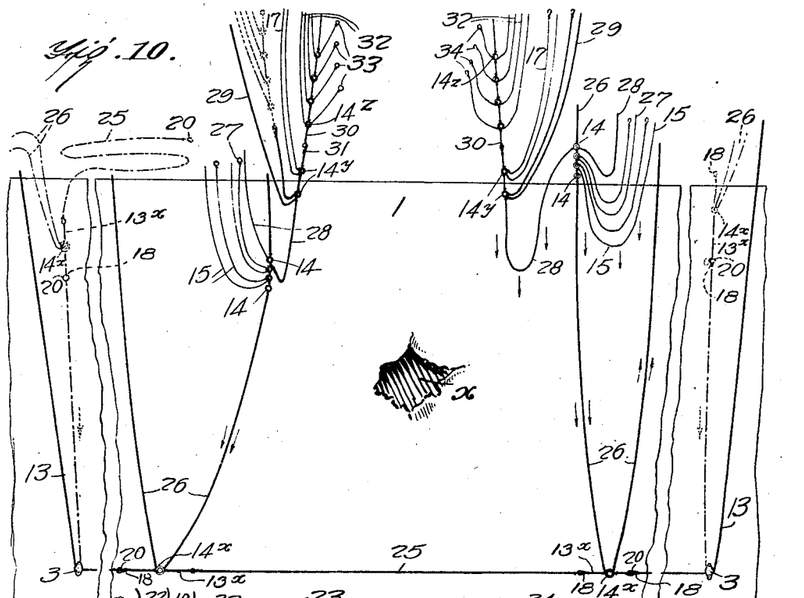
Figs. 10, 11, 12, 13, 14 and 15 are a series of similar fragmentary side elevations of the hull of a ship, showing successive steps employed in positioning three mattresses over a rent, and in stretching two sets of re-enforcing cables across the same.

Fig. 10 shows in dotted lines the normal arrangement of cables 13 and associated parts and in full lines the first stage of assembling the rigging in an emergency. As shown, the cables 13 have been joined to the short cable sections $13^x$ and to the connecting cable 25 and this has been stretched taut, so that everything is in readiness for the cables 26 to be pulled through the pulleys $14^x$, thus drawing down the associated rigging.

Figure 11:
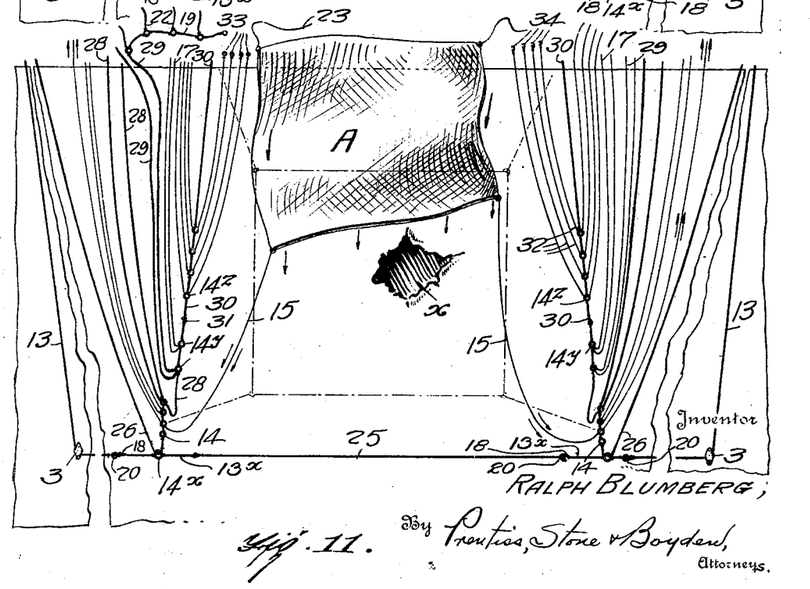

In Fig. 11, the rigging is shown in the position it occupies after the groups of pulleys 14 have been drawn down below the water line. The first step after this is to place the first mattress A by means of the cables 15 and 23, as before described.

Figure 12:
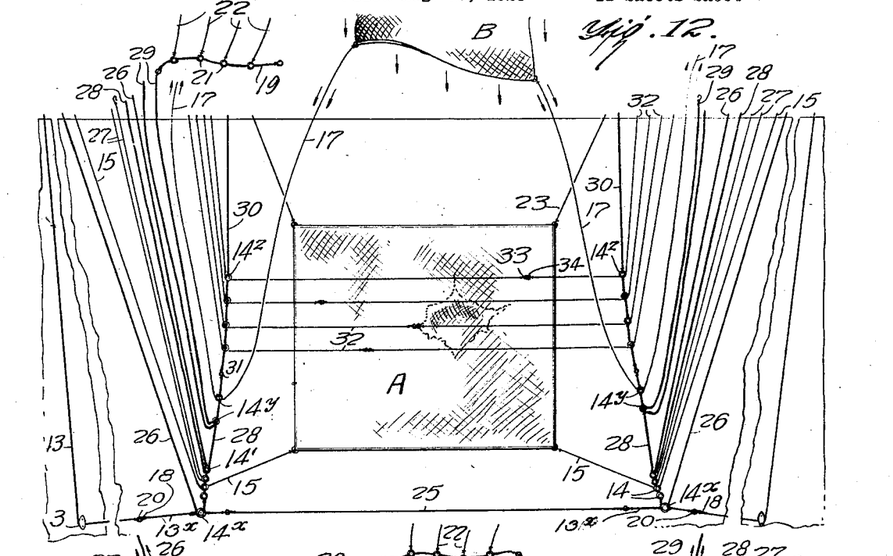

Next, the rings 33 at the end of one set of cables 32 looped around the pulleys $14^z$ are connected to the hooks 34, carried by the other set of cables 32, thus uniting the two sets into continuous cables, and these are then stretched taut by hauling upon the free ends thereof until they assume the position shown in Fig. 12, in which they extend horizontally across the rent outside of the mattress A. In this connection, it should be noted that by manipulating the cables 30 which are connected at 31 to the cables 28, and from an extension thereof, the entire series of horizontal re-enforcing cables 32 may be raised or lowered to properly position them relative to the rent. If desired, one end may be made higher or lower than the other, so that these cables extend more or less diagonally, as conditions require.

Figure 13:
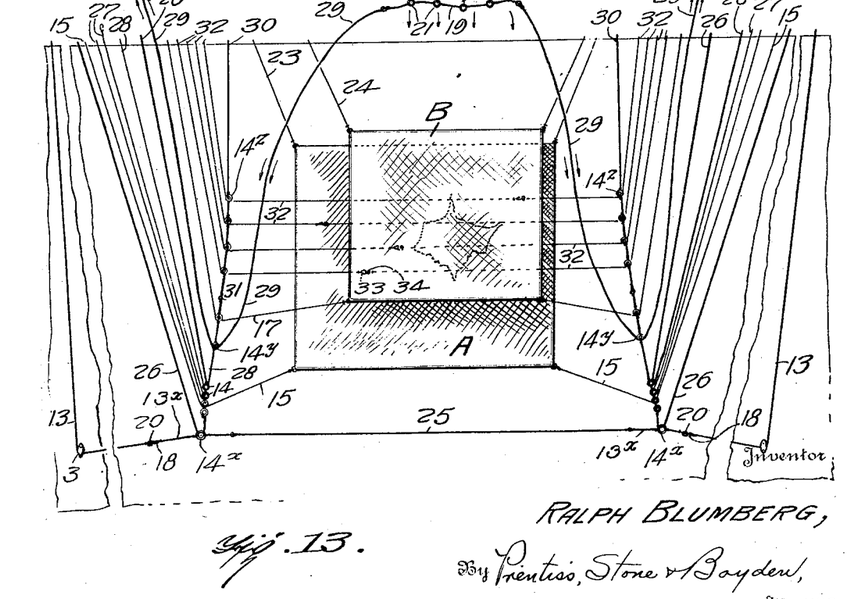
Figure 14:
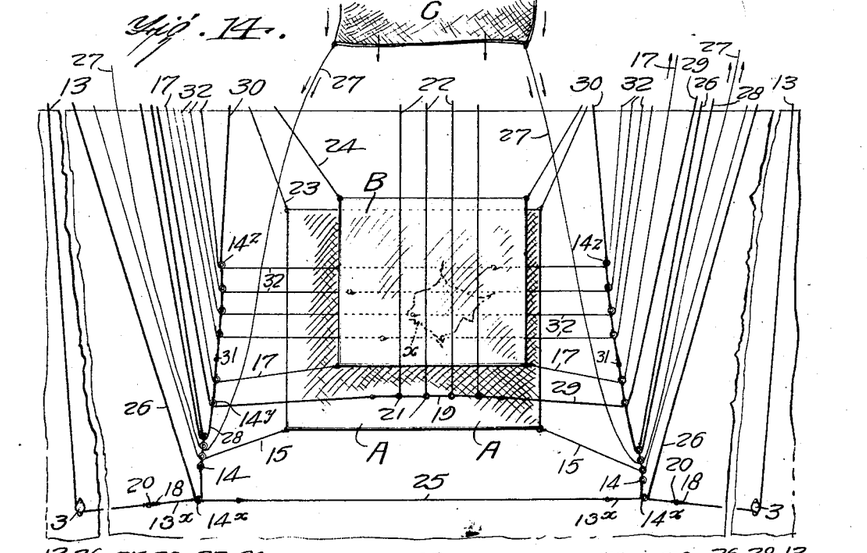

The next step is the positioning of mattress B by means of the cables 17 and 24, as before. This is shown in Fig. 13.

In the present embodiment of the invention, the vertical re-enforcing cables 22 are carried by a pair of cables 29 which are looped about the lowermost of the pulleys 14ʸ. These cables 29, connected with the cables 22, are shown in Fig. 13. Then, by hauling upon the free ends of these cables, so as to take up the slack, the rigging is brought into the condition shown in Fig. 14 in which the re-enforcing cables 22 are stretched tightly across the rent, and superposed upon the mattress B.

At this stage, it may be noted that the mattress B is interposed between the two sets of re-enforcing cables 22 and 32, so as to prevent these cables from chafing and cutting each other where they cross, as they otherwise might do.

The final step consists in superposing upon the mattress B and cables 22 a third mattress C. This is done by means of cables 27 passing around two of the pulleys 14 carried by the cables 26. The upper edge of the mattress C is secured by cables 38.

Figure 16:
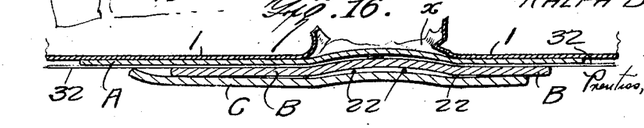
Fig. 16 is a horizontal section substantially on the line 16—16 of Fig. 15.
Figure 17:
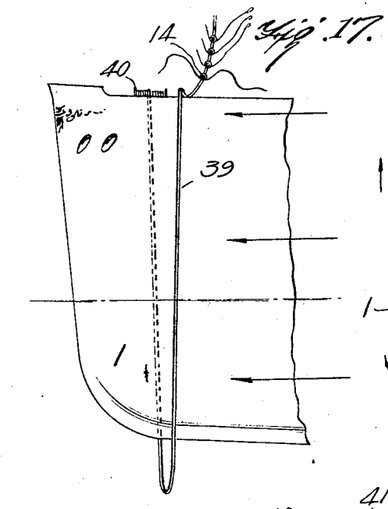
Figs. 17 and 18 are a fragmentary side elevation and conventional transverse section of the hull of a ship, respectively, showing the initial stage of a still further modified method of carrying out the present invention.

By reference to Fig. 16, it will be seen that when this rigging is all assembled, it comprises three mattresses and two sets of re-enforcing cables, the cables being located between adjacent mattresses and a mattress being located between the sets of cables. In other words, the assembled structure comprises alternate layers of mattresses and re-enforcing cables.

It will be observed by reference to the preceding figures that the number of cables used is necessarily quite large, and in order to keep the free ends of these cables from becoming entangled, and to assist in the ready assembling of the rigging, I preferably employ the arrangement shown in Figs. 28 and 29. In these figures, 35 designates a set of connected rings with which the hooks 34, carried at the ends of one set of cables 32, are normally engaged. 36 designates a similar set of connected rings, but each of these is provided with a hook 37, for the purpose of engaging the rings 33, carried at the ends of the other set of cables 32. Thus, when it is desired to connect the two sets of cables 32, as above described, the hooks 34 and rings 33 are taken off of the holders 35 and 36 and are snapped together.

In practice, I propose to normally store various sections of the rigging wound on separate drums. Thus the cables 13, 13ª, 13ᵇ, and associated parts might be wound on one drum, the cable 26, with pulleys and auxiliary cables carried thereby, up to the coupling 31 in Figs. 10 to 16, wound on another drum, etc. Thus, while the first section of rigging is being operated, the other sections can be made ready and jointed together.

By the use of the bars 4, and cables 22 and 32 as re-enforcing means to assist the mattresses in withstanding and sustaining the pressure of the water, it is possible to make the mattresses themselves of lighter construction than would be required where these bars and cables are not used, as in my prior above mentioned applications. This is a decided advantage, resulting not only in reducing the cost, but also in facilitating handling, thereby effecting a saving of time, which is often of the utmost importance.

Figure 18:
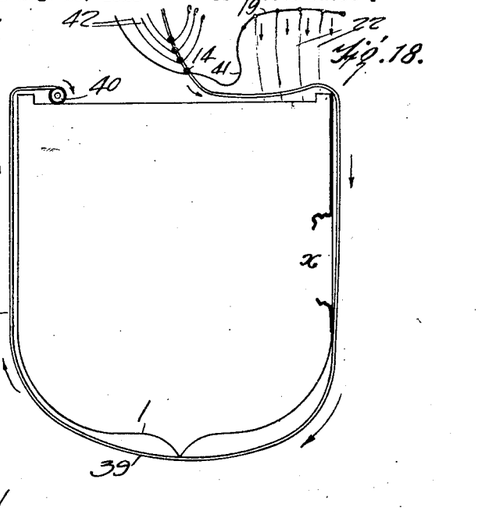
Figure 19:
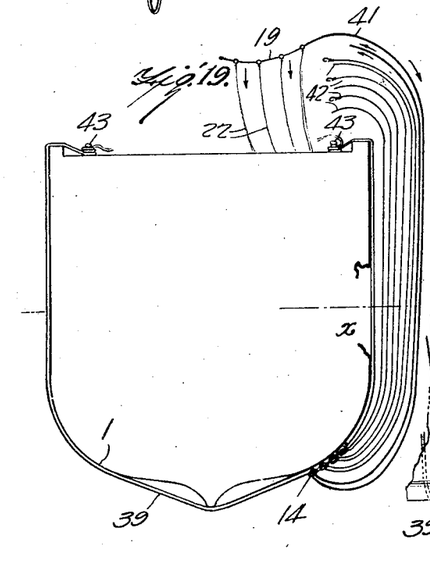
Fig. 19 is a conventional section similar to Fig. 18, but showing another stage of the method of carrying out the invention.
Figure 20:
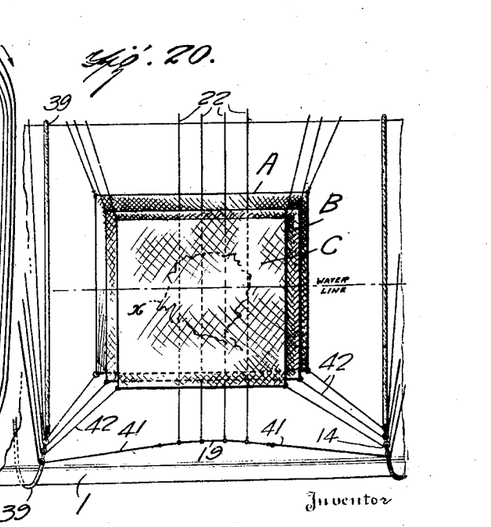
Fig. 20 is a fragmentary side elevation indicating the appearance of the parts, after the carrying out of the said method has been completed.

In Figs. 17 to 20 inclusive, I have shown a still further modified arrangement embodying some of the same principles above described. In this modification, instead of looping a cable through a cable guide fixed to the hull, I propose, when an emergency arises, to cast a loop of cable over the bow or stern of the ship, as shown at 39 in Fig. 17. Two of these loops are successfully placed over the bow, and are then moved longitudinally of the ship until the rent is reached, one such loop being positioned on each side of the rent, as shown in Fig. 20. One end of the loop is preferably secured to a winding drum 40, which, of course, is movable along the deck or other support.

The cable 39 in Figs. 17 to 20 carries a series of pulleys 14 similar to those carried by the cable 13, in Fig. 1, and through these pulleys are looped other cables 41 and 42, the latter being provided with hooks at one end. The cable 41 is associated with one of the loops 39, and is attached to one end of the chain 19, carrying the re-enforcing cables 22, and the cable 41, associated with the other loop 39, is adapted to be connected to the other end of the cable 19, so that by hauling upon the free ends of the cables 41, the cable 19 is brought down into the position shown in Fig. 20, with the re-enforcing cables 22 stretched across the rent.

It will be understood that after the loops have been cast around the hull, as shown in Fig. 18, and properly positioned, relative to the rent, the winding drums 40 are operated and the cables 39 wound up so as to carry the pulleys 14 and associated cables 41 and 42 down to a point well below the water line, as shown in Fig. 19. When this position has been reached, the ends of the cables 39 may be made fast to cleats 43 or the like, and thus securely anchored.

A pair of the cables 42 is then attached to a mattress A, which is positioned over the rent by hauling upon the free ends of these cables. The cables 41 are then manipulated as described, in order to position the re-enforcing cables 22 over the rent outside of the mattress A. Thereafter, additional mattresses B and C may be superposed upon the cables 22 and mattress A, by means of other pairs of lines 42, as will be obvious.

Figure 15:
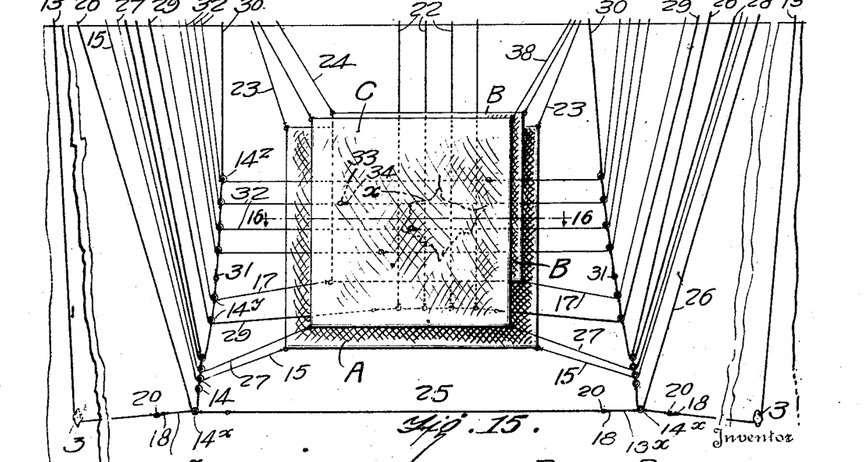

The final position of the parts is shown in Fig. 20 which, it will be seen, is very similar to Figs. 4 and 15, the main difference being that the supporting cables 39, instead of being looped through cable guiding means, are looped under and around the hull.

It will be noted that, in order to avoid the possibility of the ropes or cables attached to the several mattresses crossing and cutting one another, I propose to arrange these superposed mattresses with their edges in spaced or stepped relation, as clearly shown in Figs. 15 and 20.

In Figs. 33 to 37 inclusive, I have illustrated in detail the construction of an improved form of mattress, which is well adapted for use in connection with the above described cable systems. It is particularly desirable to use this construction of mattress for the midde or intermediate mattress B, shown in the preceding figures.

Referring to Figs. 33 to 37, the mattress, which is preferably square in shape, comprises four corner blocks 44, each provided with an eye for attachment of a cable, as above described. These corner blocks are connected by marginal link work, made up of lengths of rod or cable 45, connected by rings 46. The corner blocks are also connected by diagonally extending chains of link work connected to a central block 47 and extending therefrom to each of the four corners of the mattress.

Figures 33, 34, 35, 36:
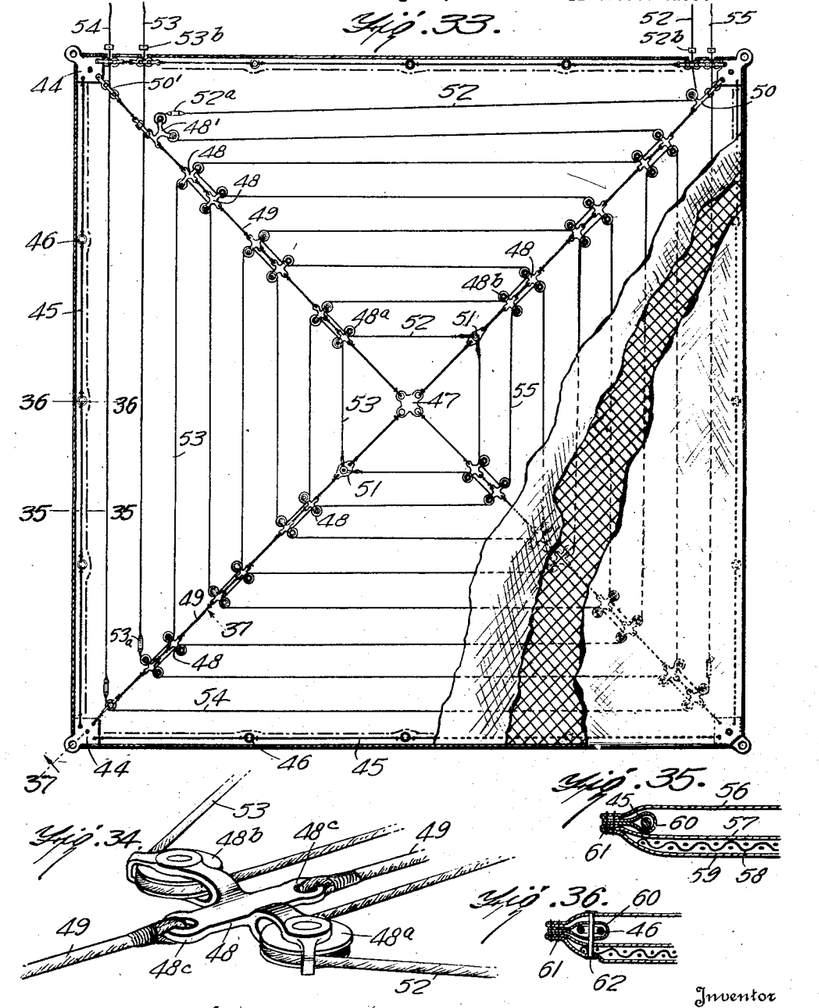
Fig. 33 is a view of an improved mattress which I may employ in connection with the present invention, parts being broken away to show the construction.
Fig. 34 is an enlarged perspective view showing the special pulley block employed in the construction of this mattress.
Figs. 35 and 36 are fragmentary transverse sections on the lines 35—35 and 36—36 respectively, Fig. 33 showing details of construction.
Figure 37:
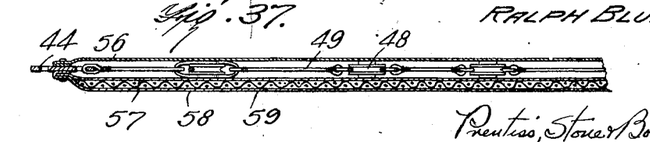
Fig. 37 is a section substantially along the line 37—37 of Fig. 33, looking in the direction of the arrows.

These lines or chains of link work comprises a series of specially constructed pulley blocks 48, connected by lengths of cable 49. They also include other pulley blocks 50 and 50', at certain special locations.

Referring to Fig. 34, it will be seen that the pulley blocks 48 comprise a central body having two pulleys $48^a$ and $48^b$, journaled at opposite sides thereof, the body being provided at its ends with eyes $48^c$ to which the cable lengths 49 are secured. Anchor blocks 51 are also included in two of the diagonal chains of link work at opposite sides of the center block 47.

From the above description, and from an inspection of Fig. 33, it will be seen that the mattress is divided by the diagonal link work into four sections or quarters. A cable 52 has one end secured to one of the anchor blocks 51, and is then led in turn over pairs of pulleys $48^a$ of adjacent pulley blocks 48 in one diagonal chain of link work, and around pairs of pulleys $48^b$ of adjacent pulley blocks of another diagonal chain of link work, in such a manner that the cable 52 passes, zig-zag fashion, back and forth, between the two diagonal chains of link work, bounding the upper quarter of the mattress and, after passing around pulley block 50, passes out through the edge of the mattress, a stop block $52^b$ being secured thereto to limit the inward movement of the cable. Preferably also one or more additional stop blocks $52^a$ are used at points within the mattress.

The left hand quarter of the mattress is provided with a cable 53 looped back and forth through the pulley blocks 48, as described, and emerges from the upper edge of the mattress, after passing through a special pulley block 48', near the upper left hand corner of the mattress, the cable 53 being provided with stop blocks $53^a$ and $53^b$, as described in connection with the cable 52.

The lower quarter of the mattress is provided with a cable 54, looped back and forth between the diagonal chains of link work in a similar manner, but having its end brought upwardly through the left hand quarter, and through a special pulley block 50', so that it emerges from the upper edge of the mattress.

The right hand quarter of the mattress is similarly provided with a cable 55, looped back and forth as described, and also emerging from the upper edge of the mattress. Thus, the free ends of all four of the cables 52 to 55 inclusive are led out of the upper edge of the mattress, from which they must be extended to the deck or other suitable position where they may be readily accessible.

Co-extensive with the above described link work is a sheet 58 of wire netting or the like, this wire netting being separated from the link work by a partition 57 of canvas or the like. The link work is itself enclosed with a cover 56 of canvas, and a similar cover 59 is placed over the wire netting, so that the entire mattress is provided with a canvas casing. The edges of the three layers of canvas 56, 57 and 59 are brought together and stitched or riveted as shown at 61 in Fig. 35. Moreover, the marginal link work 45 is preferably enclosed in an envelope 60 of canvas or the like, the outer edges of which are secured between the edges of the canvas cover when the same is stitched or riveted.

In order to still more strongly secure the parts, I provide bolts or rivets 62, extending from side to side of the mattress adjacent the edges thereof, and preferably passing through the rings 46, as clearly shown in Fig. 36.

With a mattress constructed as above described, and after the same has been positioned over the rent and secured by means of cables 17 and 24, for example, as shown in some of the preceding figures, it is possible, by pulling upon the cables 52 to 55, shown in Fig. 33, to stretch the link work of the mattress taut by means of tension internally applied, and it will be also observed that each of the four quarters of the mattress may be individually tightened or tensioned. In this way, I can compensate for any irregularities of the surface against which the mattress rests, and can always maintain the mattress taut, and prevent excessive yielding or bulging thereof.

What I claim is:—

1. The combination with a ship, of cable guiding means fixedly attached thereto at a point below the water line, a cable looped through said guiding means, a ring or pulley, a mattress carrying cable looped through said ring or pulley, and means, consisting wholly of a flexible cable system, including said first cable, for positioning said ring or pulley at a point below the water line, when required.

2. The combination with a ship, of a pair of cable guiding devices fixed thereto at a point below the water line, and spaced apart longitudinally of the ship, of a separate cable looped through each guiding device, and means carried by each cable alone for supporting and positioning a mattress-carrying cable.

3. The combination with a ship, of a pair of cable guiding devices fixed thereto at a point below the water line, and spaced apart longitudinally of the ship, of a cable looped through each guiding device, a ring or pulley independently carried by each cable, flexible means uniting the ends of said cables whereby said rings or pulleys may be held a definite distance apart below the water line and a second cable looped through each of said rings or pulleys.

4. The combination with a ship, of means for lowering a mattress into position over a rent in the side thereof, which comprises a plurality of downwardly extending bars pivotally supported at their upper ends adjacent the deck, and a strut for temporarily supporting the bars so that they lie at an angle to the vertical and have their lower ends spaced from the side of the ship, thus constituting an inclined bridge or way down which a mattress may slide, whereby, when said supporting strut is removed said bars will swing by gravity into contact with the side of the ship.

5. The combination with a ship, of means for positioning a mattress over a rent in the hull thereof, and means for stretching a series of separate re-enforcing cables across the rent, under but independently of the mattress.

6. The combination with a ship, of means for positioning a mattress over a rent in the hull thereof, and means for stretching a series of independent vertical re-enforcing cables across the rent, under the mattress.

7. The combination with a ship, of means for positioning a mattress over a rent in the hull thereof, and means for stretching a series of independent horizontal re-enforcing cables across the rent; under the mattress.

8. The combination with a ship, of means for positioning a mattress over a rent in the hull thereof, and means for stretching a series of both vertical and horizontal independent cables across the rent, adjacent the mattress.

9. The combination with a ship, of means for positioning a mattress over a rent in the hull thereof, means for stretching a series of re-enforcing cables across the rent, over said mattress, and means for positioning a second mattress upon the first, and over said cables.

10. The combination with a ship, of means for stretching a series of cables across a rent in the hull thereof, means for positioning a mattress over the rent, outside of said cables, means for stretching a second series of cables across the rent, over the said mattress, and means for positioning a second mattress outside of said second series of cables.

11. The combination with a ship, of means for stopping a rent in the hull thereof comprising a pair of mattresses with a series of re-enforcing cables stretched across the rent and lying between them.

12. The combination with a ship, of means for stopping a rent in the hull thereof comprising two series of cables stretched across the rent, at an angle to each other, and a mattress interposed between said series of cables.

13. The combination with a ship, of means for stopping a rent in the hull thereof comprising a compound structure made up of alternate layers of mattresses and series of independent re-enforcing cables.

14. The combination with a ship, of a pair of cable guiding devices fixed thereto at a point below the water line, a cable looped through each of said guiding devices, a series of cables adapted to be stretched across a rent in the hull of the ship and means carried by said first mentioned cables for supporting said last mentioned series of cables.

15. The combination with a ship, of a pair of cable guiding devices fixed thereto at a point below the water line and spaced apart, of a cable looped through each of said guiding devices, a ring or pulley carried by each of said cables, a series of re-enforcing cables adapted to be stretched across a rent in the hull of the ship, a line looped through each of said rings or pulleys, and means carried by said line for supporting said series of re-enforcing cables.

16. The combination with a ship, of a pair of cable guiding devices fixed thereto at a point below the water line, and spaced apart, of a cable looped through each of said guiding devices, a ring or pulley carried by each cable and a line passing through each ring or pulley, a series of re-enforcing cables connected at one end with the end of one of said lines, and means for connecting this end of such line with the end of the other line, whereby, when said two lines are drawn taut, one end of the re-enforcing cables are carried below the water line, and may be positioned longitudinally of the ship by pulling upon one or the other of said lines.

17. The combination with a ship, of a pair of cable guiding devices fixed thereto at a point below the water line, a cable looped through each of said devices, rigging comprising two sets of rings or pulleys supported by said cables and a plurality of independent lines looped through each set, and adapted to be attached in pairs to a plurality of mattresses.

18. The combination with a ship, of means for supporting and positioning a pair of substantially vertically extending cables adjacent the hull thereof and spaced apart, means for shifting said cables so as to position them, one on each side of a rent in the hull, a set of rings or pulleys carried by each of said cables, and a series of re-enforcing cables extending through the rings or pulleys of both sets and stretched across the rent.

19. The combination with a ship, of a series of substantially vertical re-enforcing cables adapted to be stretched across a rent in the hull thereof, means for supporting the lower end of said cables at a point below the water line, and means for shifting said cables longitudinally of the ship in order to properly position them over the rent.

20. The combination with a ship, of a series of substantially horizontally extending re-enforcing cables adapted to be stretched over a rent in the hull thereof, and means for adjusting said series of cables vertically, so as to properly position them over the rent.

21. The combination with a ship, of a plurality of mattresses adapted to be placed over a rent in the hull thereof, a plurality of pairs of lines for manipulating said mattresses, a plurality of sets of rings or pulleys around which said lines are looped, and flexible means for adjusting said sets of pulleys both vertically and longitudinally of the hull, so as to enable the mattresses to be properly positioned over the rent.

22. The combination with a ship, of a mattress adapted to be placed over the rent in the hull thereof, a pair of lines adapted to be attached to said mattress for manipulating the same, a pair of rings or pulleys around which said lines are looped, and means consisting wholly of flexible members for supporting and individually adjusting said pulleys both longitudinally and vertically of the hull, so as to enable the mattress to be properly positioned over the rent, as required.

23. A mattress for the purpose described comprising a frame of link work, a sheet of wire netting co-extensive therewith, a canvas covering inclosing the link work and netting and a canvas partition separating the netting from the link work.

24. A mattress for the purpose described, comprising a frame of link work, a canvas covering therefor, means for supporting the mattress at its four corners and means for internally tensioning said link work.

25. A mattress for the purpose described, comprising a frame of link work and a suitable covering therefor, some of said link work extending diagonally from corner to corner, so as to divide the mattress into four quarters, and means for internally exerting tension on the link work comprising each quarter of the mattress.

26. A mattress for the purpose described, comprising a frame of link work, and a suitable covering, two diagonal lines of link work extending from opposite corners of the mattress and crossing at the center, each line comprising a series of connected pulley blocks, each block having a pair of pulleys, and cables anchored near the center of the mattress and extending back and forth around said pulleys, to the outside of the mattress, one cable being provided for each quarter of the mattress, whereby by pulling upon said cables, tension may be exerted upon the link work of each individual quarter.

27. In an emergency rigging for ships, the combination with cable guiding means, of a cable system adapted to run therethrough and made up of a plurality of connected cable lengths, the connection between the ends of such cable lengths comprising an eye formed in the cable, the entire cable end, including the eye, being of substantially uniform diameter.

In testimony whereof I affix my signature.

RALPH BLUMBERG.